Sept. 30, 1952  R. E. CRANDALL ET AL  2,612,329
AILERON, FLAP, AND DIVE BRAKE
Filed Nov. 13, 1948  5 Sheets-Sheet 1

INVENTORS
RONALD E. CRANDALL
BY JOHN E. GLENN

Herbert E. Metcalf
Attorney

Sept. 30, 1952 R. E. CRANDALL ET AL 2,612,329
AILERON, FLAP, AND DIVE BRAKE
Filed Nov. 13, 1948 5 Sheets-Sheet 2
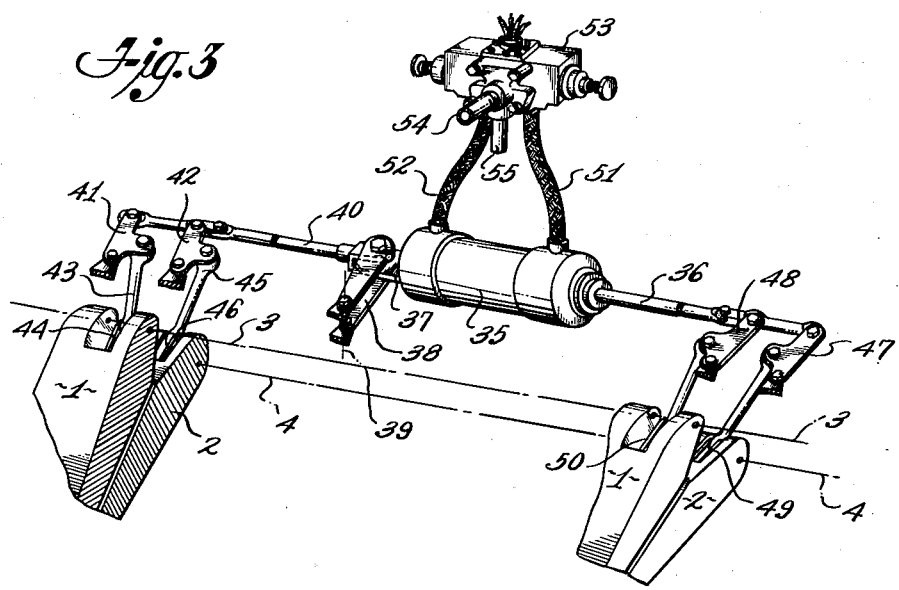
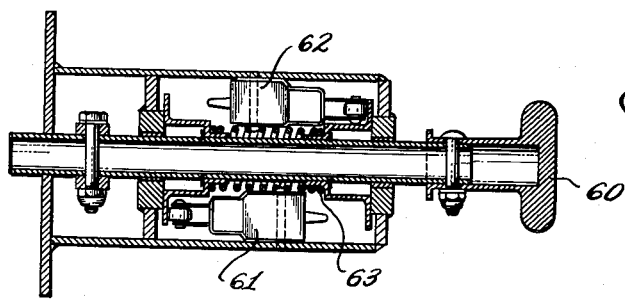
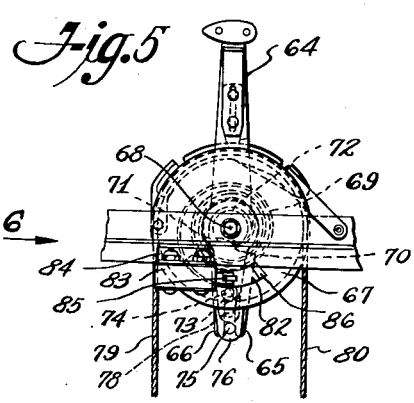
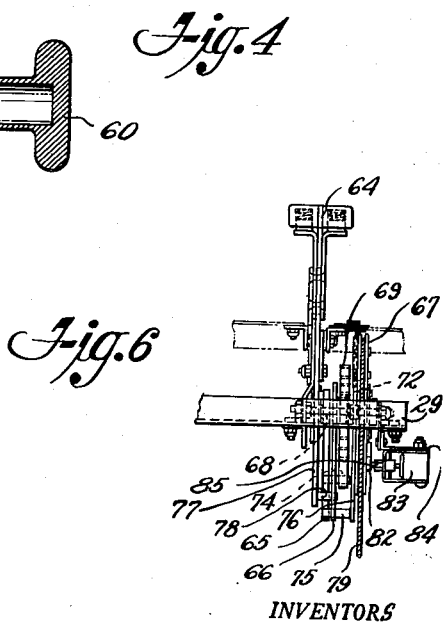
INVENTORS
RONALD E. CRANDALL
BY JOHN E. GLENN
Herbert E. Metcalf
Attorney Sept. 30, 1952  R. E. CRANDALL ET AL  2,612,329
AILERON, FLAP, AND DIVE BRAKE
Filed Nov. 13, 1948  5 Sheets-Sheet 3

INVENTORS
RONALD E. CRANDALL
BY JOHN E. GLENN
Herbert E. Metcalf
Attorney

Sept. 30, 1952 R. E. CRANDALL ET AL 2,612,329
AILERON, FLAP, AND DIVE BRAKE
Filed Nov. 13, 1948 5 Sheets-Sheet 4

INVENTORS
RONALD E. CRANDALL
JOHN E. GLENN
BY Herbert E. Metcalf
Attorney

Sept. 30, 1952  R. E. CRANDALL ET AL  2,612,329
AILERON, FLAP, AND DIVE BRAKE
Filed Nov. 13, 1948  5 Sheets-Sheet 5

INVENTORS
RONALD E. CRANDALL
BY JOHN E. GLENN
Herbert E. Metcalf
Attorney

Patented Sept. 30, 1952

2,612,329

UNITED STATES PATENT OFFICE 2,612,329

AILERON, FLAP, AND DIVE BRAKE

Ronald E. Crandall and John E. Glenn, Los Angeles, Calif., assignors to Northrop Aircraft, Inc., Hawthorne, Calif., a corporation of California Application November 13, 1948, Serial No. 59,848

5 Claims. (Cl. 244—42)

This invention relates to airplane control systems and control surfaces, and more particularly to a system for controlling the action of a single portion of the wing area so that this portion can act as an attitude control surface and an air brake, or as an attitude control surface and an aileron type landing flap, or as an attitude control surface and a split-flap type landing flap.

In high speed airplanes, particularly military aircraft, devices have been incorporated to act as air brakes in slowing their speed and to aid in preventing the airplane from attaining excessive speeds during diving maneuvers. The name "dive brake" has thus been applied to such devices, which generally consists of one or more auxiliary surfaces or flaps which are extended into the air stream to increase the drag forces acting on the airplane. However, inasmuch as higher speed airplanes tend to have thinner wing sections and smaller wing areas, the problems of locating space for surface operating mechanisms and finding wing area for mounting the various desirable separate control surfaces themselves become more difficult and in some cases impractical of solution.

It is, therefore, an object of the present invention to simplify the problem of wing layout and also to obtain the desired action provided by various movable control surfaces. Using the present method, the dive brake surfaces are not additional surfaces requiring extra mounting means and additional portions of wing area, but dive brake action is accomplished by splitting the top and bottom panels of the aileron on each side of the airplane simultaneously, thus producing a balanced drag.

It is a further object of this invention to provide control systems for an airfoil combining the various functions as mentioned which can be operable by conventional piloting procedures and controls, and which, in addition, will not transmit erratically varying surface loads to the pilot which have to be offset by pilot control forces.

A preferred specific apparatus which embodies the above functions comprises the following main parts, which are duplicated on the opposite side of the airplane: an airfoil section comprising an upper and a lower panel hinged separately at their forward edges to a nose section which is in turn hinged to the wing trailing edge structure. A mechanism for rotating the entire airfoil about the nose section hinge line is located in the wing forward of the surface. A mechanism for separating the upper and lower panels of the airfoil about their respective hinge lines is located in the nose section of the airfoil.

Briefly, the operation of this airfoil is as follows: as a dive brake, the surface splits half up and half down, totalling 120° open. As a landing flap, the entire surface first lowers to 30° down and then splits open 60°, thus returning the upper panel to a substantially faired position with the wing and placing the lower panel 60° down. Various increments of surface position as a solid landing flap can be had, but the split flap action has only the two positions besides closed; those of 60° and 120° open. At all positions of surface whatsoever, normal aileron action can modify the basic deflection by the full range of aileron control in either direction from the instantaneous neutral. This range of aileron control movement is approximately 13° up and 13° down, rotating about the nose section hinge line. Three separately-operated pilot controls modify this airfoil, which sometimes acts as a single unit and at other times as a split surface with upper and lower panels. However, electrical connections between the dive brake control mechanism and landing flap control mechanism are such as to prevent the maximum additive deflected positions of the panels which might otherwise be possible mechanically.

The invention may be more fully understood by reference to the accompanying drawings, shown by way of illustration and not limitation, in which:

Figure 3 is a diagrammatic view showing the dive brake operating mechanism of the same control surface.

Figure 4 is a longitudinal section view showing a pilot's dive brake control handle.

Figure 5 is a side elevation view showing a pilot's landing flap control lever.

Figure 6 is a rear elevation view of the lever mechanism of the flap control lever, as indicated by the arrow 6 in Figure 5.

Figure 11:
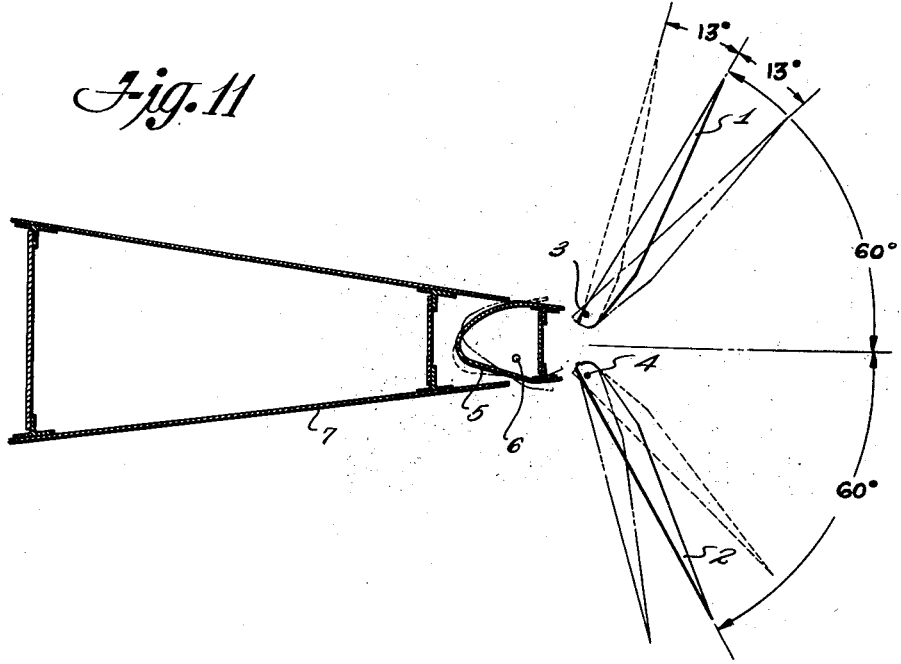
Figure 12:
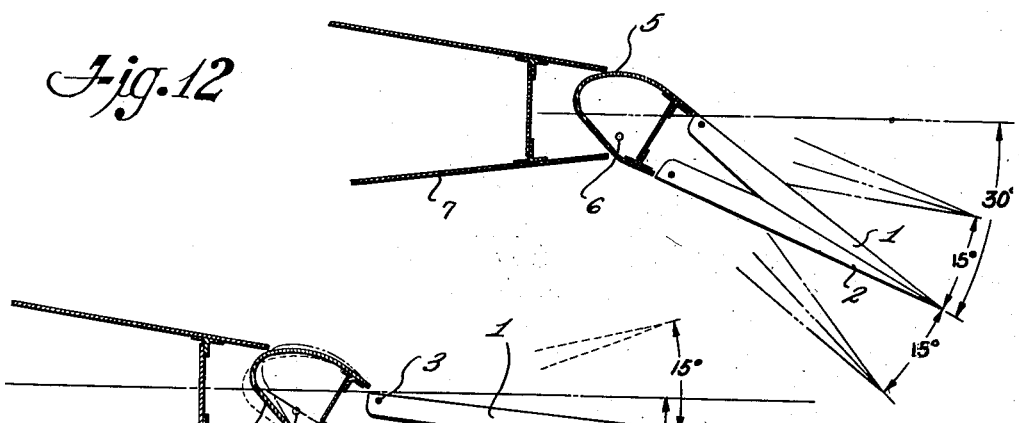
Figure 13:
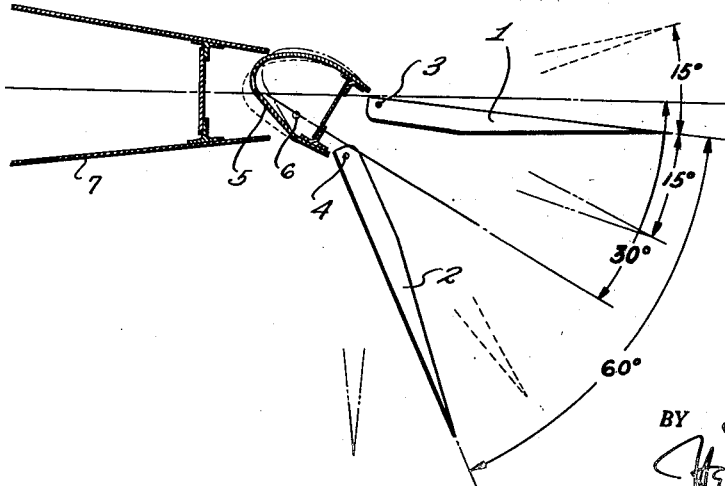

Figures 11, 12, and 13 are cross-sectional diagrammatic views showing various positions assumed by the trailing edge control surface.

Figure 1:
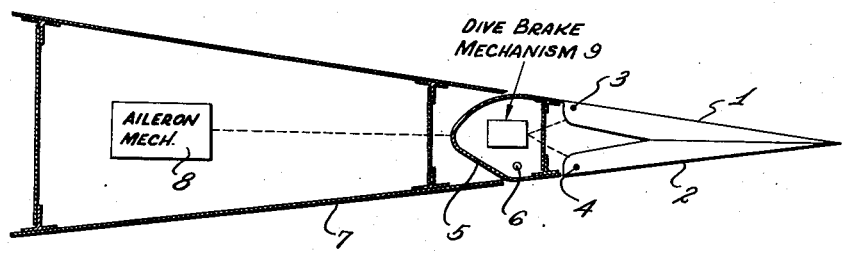
Figure 1 is a block diagram showing a cross-section of a control surface on the trailing edge of an airplane wing.

Referring first to Figure 1, an upper surface 1 and a lower surface 2 of an airfoil are pivoted forwardly at their respective hinge lines 3 and 4 to a nose section 5. The nose section 5 is pivoted at a nose hinge line 6 to the trailing edge structure of a wing 7. Installed in the wing 7 forward of the airfoil is an aileron mechanism 8 which operates to rotate the nose section 5 and the surfaces thereon about the nose hinge line 6. Installed inside and fixed to the nose section 5 is a dive brake mechanism 9 which operates to simultaneously deflect the upper surface 1 upwardly about hinge line 3 and deflect the lower surface 2 downwardly about hinge line 4. Both mechanisms are parts of full-power control systems used to operate the airfoil components in a manner to be described herein. Fully powered control systems are ideally suited to the present invention, since no surface loads are fed back to the pilot with this type of control.

*Aileron mechanism*

Figure 2:
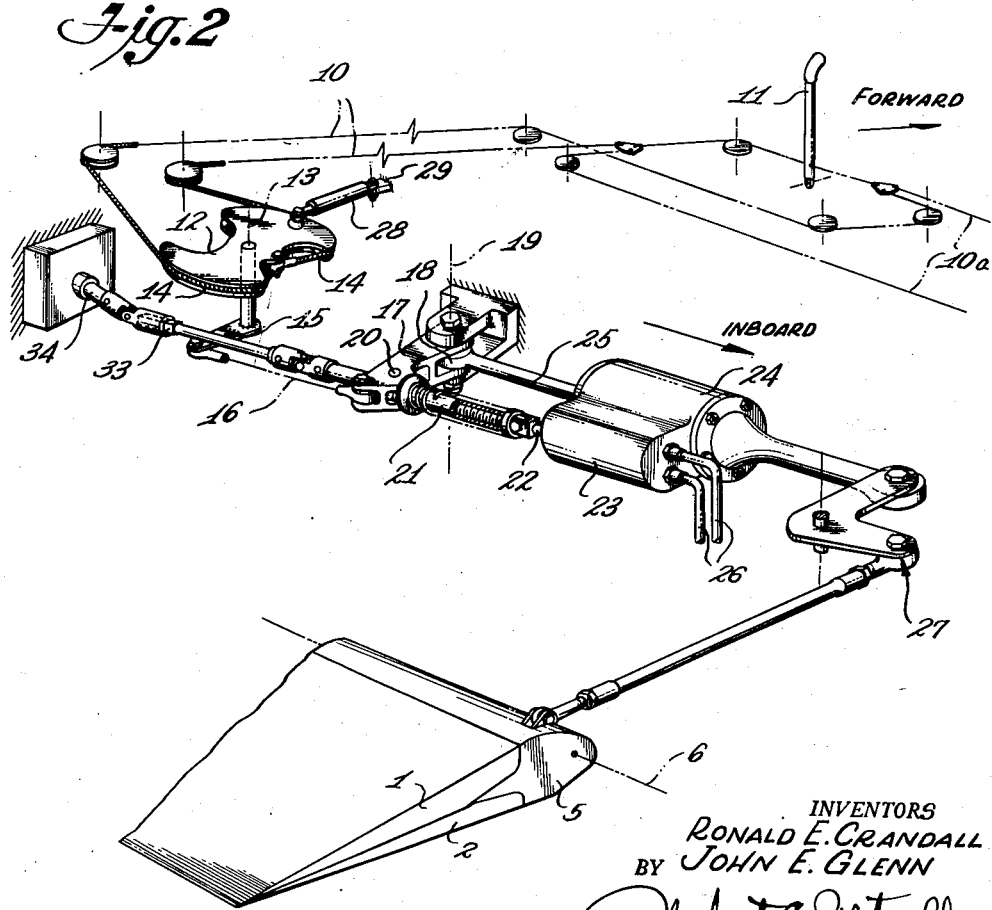
Figure 2 is a perspective diagrammatic view showing the aileron operating mechanism of the trailing edge control surface.

The aileron mechanism 8 will be described first. As shown in Figure 2, a pair of aileron control cables 10 lead from a pilot's control stick 11, for example, to a cable quadrant 12 in the left-hand outer wing forward of the left-hand airfoil to be operated. Additional aileron control cables 10a operated by the control stick 11 lead to the right-hand wing for simultaneous operation of the right-hand airfoil by a system identical in operation to the left-hand aileron system to be described, but connected in reverse direction for conventional aileron control. The cable quadrant 12 is rotatably mounted on a fixed quadrant axis 13, and the cables 10 are connected, one in a groove 14 on each side of the quadrant 12 so that conventional movement of the control stick 11 will produce rotational motion of the cable quadrant 12. Connected to a quadrant arm 15 is a control rod 16 in turn connected to one end of a bell crank 17 located inboard from the cable quadrant 12, the other end of the bell crank 17 being rotatably mounted together with a hydraulic piston rod terminal 18 on a fixed bell crank axis 19. A gimbal and bearing connection 20 near the outer end of the bell crank 17 carries a variable length screw assembly 21 which connects at its inboard end to a valve shaft 22 of a servo control valve 23. The servo control valve 23 is contained in and fixed to the housing of a hydraulic aileron actuating cylinder 24 which carries an aileron piston rod 25 terminating at the bell crank axis 19 as mentioned before. This servo valve 23 is provided with fluid pressure and return connections 26 from the airplane's hydraulic power supply, and controls the direction of fluid to the proper side of the enclosed actuating cylinder piston (not shown) to extend or retract the aileron piston rod 25 attached thereto relative to the aileron cylinder 24. The closed, inboard end of the aileron actuating cylinder 24 is pin-connected to an operating linkage arrangement 27 which is connected directly to the airfoil nose section 5 to rotate the entire airfoil about the nose hinge line 6 when fluid pressure displaces the aileron actuating cylinder 24. A centering spring assembly 28 is pin-connected between the cable quadrant 12 and the aircraft structure 29. In the neutral position of the controls, the centering spring center line is along a radius of the quadrant 12, so that movement of the controls to either side of neutral will introduce a "feel" to the system, tending to restore it to neutral.

The full-power hydraulic attitude control surface system thus far described is somewhat similar to that fully shown and claimed in a co-pending application, Serial No. 23,567, filed April 27, 1948. Other types of full-power systems can be employed instead of the hydraulic control system shown herein, such as the full-power electric attitude control surface system disclosed in a co-pending application, Serial No. 65,806, filed December 17, 1948, or two different types of full-power sources can be combined, using one or the other as a stand-by system, similarly to the method shown in another co-pending application, Serial No. 42,265, filed August 3, 1948.

*Landing flap mechanism*

The variable length screw assembly 21 is attached to a telescoping square shaft assembly 33 so that rotation of the square shaft will turn one end of the screw assembly 21 in the gimbal connection 20 and thus move the valve shaft 22 to produce independent deflection of the airfoil nose section 5. In one preferred form of the invention, this square shaft 33 is connected to an extension 34 of a separate landing flap drive mechanism, so that lowering of the landing flaps will cause simultaneous lowering of the aileron surface at both wing tips while still permitting normal roll control wtih the hydraulic aileron system, similarly to the method shown in a fourth co-pending application, Serial No. 57,518, filed October 30, 1948. However, it is entirely possible to omit the separate landing flaps, merely connecting the square shaft 33 to a power source and control of its own, and still obtain the desired landing flap action from the drooping ailerons.

With the addition of the landing flap system extension to the aileron operating mechanism as described above, the airfoil under consideration has combined in it the function of an aileron and a landing flap. In the present apparatus, while the separate landing flap lowers to a position 50° down from normal, both aileron surfaces lower to a position approximately 30° down from neutral. The control signals to operate the combination airfoil have been applied to the mechanism which rotates the entire airfoil about the nose hinge line, so that the separate split surfaces have remained together in the closed position.

*Dive brake mechanism*

The dive brake mechanism located in the nose section 5 of the airfoil on the left-hand side of the airplane will now be described. The mechanism on the right-hand side operates in the same manner and both are controlled simultaneously. Installed in a lateral position near the center of the nose section 5 is a hydraulic dive brake actuating cylinder 35 with the customary piston (not shown) and dive brake piston rod 36, as shown in Figure 3. Neither end of this cylinder nor the piston rod is fixed to the nose section structure, but one cylinder end 37 is pin-connected approximately at right angles to a support link 38 which can turn freely on a fixed pivot 39. To the same cylinder end 37 is connected an actuating tube 40 which operates two outboard bell cranks 41 and 42 pivoted in the outboard end of the nose section 5. The first bell crank 41 connects through a link 43 to an upper dive brake horn 44 and the second bell crank 42 connects through a similar link 45 to a lower dive brake horn 46. The upper dive brake horn 44 is solidly attached to the upper dive brake surface 1 near the hinge line 3 and projects downwardly so that a rearward push on it will rotate the upper surface 1 upwardly at the trailing edge. The lower dive brake horn 46 is similarly attached to a lower dive brake surface 2, but projects upwardly, so that a rearward push on it will rotate the lower surface 2 downwardly at the trailing edge. In this manner, when the actuating tube 40 is forced toward the dive brake actuating cylinder 35 by hydraulic fluid pressure acting on the retraction side of the cylinder piston, the bell cranks 41 and 42 will rotate clockwise (from the top) and act simultaneously on the upper and lower dive brake surfaces to separate them.

Returning to the inboard end of the dive brake cylinder 35, the dive brake piston rod 36 is connected to two inboard bell cranks 47 and 48. These bell cranks are each linked to a second dive brake horn 49 and 50 on each dive brake surface similarly to the arrangement at the outboard end. The direction of operation is such that when the dive brake piston rod 36 is forced toward the dive brake actuating cylinder 35 by pressure acting on the retraction side of the cylinder piston, as above, the inboard bell cranks 47 and 48 will rotate counterclockwise (from the top) and act simultaneously on the upper and lower dive brake surfaces to separate them, in cooperation with the outboard bell cranks 41 and 42.

It will thus be seen that the floating dive brake actuating cylinder 35 forms a variable-length portion of an effective link between the inboard and outboard bell cranks, and that when this link is contracted or expanded, by cylinder pressure, the dive brake surfaces 1 and 2 will be opened or closed respectively, rotating about their hinge lines 3 and 4. Since each dive brake surface has two operating horns (inboard and outboard), which must move together at all times due to the same part they are mounted on, movement of the dive brake actuating cylinder 35 in one direction will always equal the movement of the dive brake piston rod 36 in the opposite direction during any opening or closing procedure.

The hydraulic dive brake actuating cylinder 35 is provided with a flexible "close" line 51 and a flexible "open" line 52 which alternately act as pressure and return lines for hydraulic fluid. These lines lead from a solenoid-operated dive brake control valve 53 mounted in the trailing edge structure of the wing 7. The solenoid valve 53 has two ports for a pressure supply line 54 and a return line 55 which come from the airplane's hydraulic system, and two solenoids (not shown) control its operation. Normally, when both solenoids are deenergized, the solenoid valve 53 is spring-controlled in the neutral position, closed to both cylinder "close" and "open" lines 51 and 52. When one valve solenoid is energized, the valve moves to supply pressure to the "close" cylinder line 51 and open the "open" cylinder line 52 to the return line 55. When the second valve solenoid is energized, instead of the first, the solenoid valve 53 moves to supply pressure to the "open" cylinder line 52 and open the "close" cylinder line 51 to the return line 55. This solenoid valve 53 will not be described in detail since its operation is well known to those skilled in the art.

Figure 10:
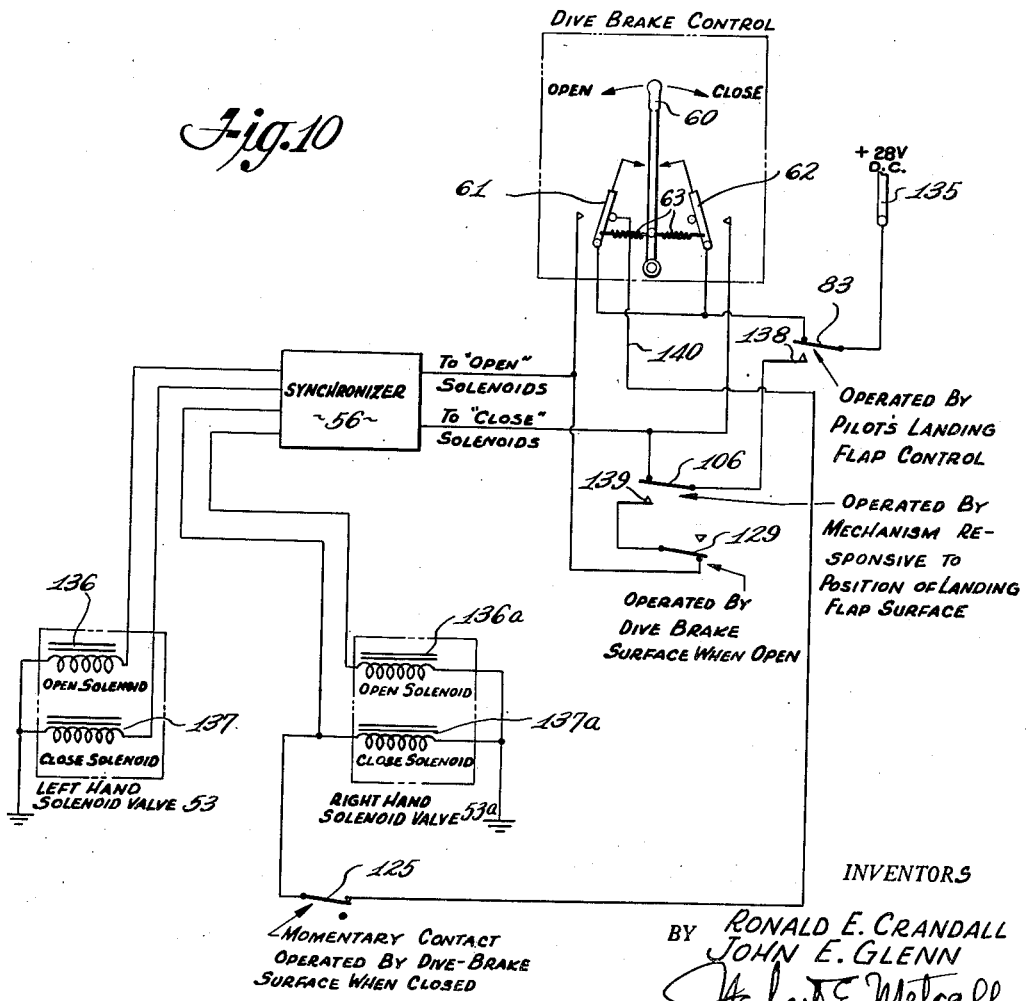
Figure 10 is a schematic electrical drawing diagrammatically showing the dive brake control circuit.

Since the dive brake surfaces on the opposite sides of the airplane are operated by separate control valves, it would be possible for these surfaces to operate at slightly differing rates of motion and to assume different open positions if and when their motion were to be stopped before reaching the maximum open position. Therefore, a synchronizing system 56, Figure 10, is preferably employed to keep both sides in the same relative position when moving. This system consists of a surface-operated potentiometer on each side of the airplane, the movable contacts of which are fixed to move with the surfaces and govern a bridge circuit which includes a polarized relay. By closing one of two contacts, depending on the direction of current flow if surface positions differ, the polarized relay will energize a power relay which will break the electrical circuit to the solenoid valve on the side of the airplane where the surfaces are opening or closing faster. Thus, the valve momentarily returns to neutral until the slower side has caught up to where the polarized relay again opens. This synchronizing system will not be described in detail, since the operation of a polarized relay in a bridge circuit is well known.

*Pilot's control elements*

As mentioned before, the dive brake, landing flap, and aileron functions are separately controlled at the pilot's station. As shown in Figure 4, the pilot's dive brake control is a three-position push-pull handle 60 containing two microswitches, one an "open" switch 61, and the other a "close" switch 62. When this control handle 60 is pulled, the "open" switch 61 only is actuated; when the handle is pushed, the "close" switch 62 only is actuated; and when the handle is released, a switch spring 63 returns the handle 60 to neutral where neither switch is actuated.

The pilot's landing flap control is shown in Figures 5 and 6. A flap control lever 64, outer drive lever 65, inner drive lever 66, and flap cable pulley 67 are pivotally and independently mounted side-by-side on a mounting bolt 68. A torsion spring 69 is also centrally positioned about the mounting bolt 68 between the inner drive lever 66 and the flap cable pulley 67. The inner end of this spring has a tang 70 which fits into an arbor slot 71 cut out of an arbor 72 constructed integrally with the inner drive lever 66 about its axis of rotation. The outer end of the torsion spring 69 has a loop 73 into which fits a drive lever pin 74 fixed to the outer drive lever 65 near its outer end, after the spring has been preloaded by a predetermined amount of wind-up.

In the neutral position of the flap controls, the outer ends of both drive levers 65 and 66 are held apart against the rotative force of the preloaded spring by a pulley arm pin 75 which is fixed to a cable pulley arm 76 attached to the flap cable pulley 67. Since both drive levers are bearing against this pulley arm pin 75, one on each side, no resultant force is exerted on the flap cable pulley 67 to rotate it about the mounting bolt 68. If, however, either the outer drive lever 65 or inner drive lever 66 is displaced in the direction away from the pulley arm pin 75, the torsion spring 69 is thus wound tighter, and the force of the other drive lever, which is acted on by the other end of the spring, exerted on the pulley arm pin 75 tends to rotate the flap cable pulley 67 in the same direction as the initial drive lever was displaced. Assuming the cable pulley 67 is free to turn, it will reach a new neutral position when the pulley arm pin 75 again contacts the end of the drive lever which was displaced.

A lower extension 77 of the flap control lever 64 is provided with a control lever pin 78 which also fits between the drive lever ends, and is for the purpose of contacting and rotating one of the drive levers 65 or 66, depending upon which direction the flap control lever 64 is moved. The flap cable pulley 67 is connected by flap control cables 79 and 80 to a flap operating mechanism (partly shown in Figure 7) so that the position of the flap cable pulley 67 always corresponds to the instantaneous position of the landing flaps (not shown). In this manner, the flap cable pulley can indicate relative position of the flaps by carrying a pointer moving over a graduated scale attached to the aircraft structure.

Thus, a non-rigid prepositioning system is provided, which permits rapid movement of the flap control lever 64 to a desired position where the flaps will follow until the pulley arm pin 75 and the control lever pin 78 reach the new neutral position at which the external torsional force on the flap cable pulley is removed.

When the flap lever 64 is rotated aft, the pulley cables 79 and 80 will operate a flap control valve 81 (Figure 7) to lower the separate landing flaps (not shown), and when the flap lever 64 is rotated forward, the landing flaps will be retracted. Mounted on the flap cable pulley 67 is a beveled-end cam 82 which is arcuate in shape with its center of arc at the center of the pulley. A dive brake interconnecting switch 83 mounted on a switch bracket 84 secured to the airplane structure 29 has an actuator roller 85 which rides on the cam 82 in any position of the flap cable pulley 67 except the extreme "flaps up" position, at which position the actuator roller 85 will run off the cam 82 at its beveled-end 86 and return the interconnecting switch 83 to its normal, non-actuated, position. This switch functions to render the dive brake circuit inoperative when the landing flaps are lowered, as will be discussed later in a description of electrical operation.

Aileron control is affected by conventional movements of the pilot's control stick 11, as shown diagrammatically in Figure 2.

Electrical switches

Figure 7:
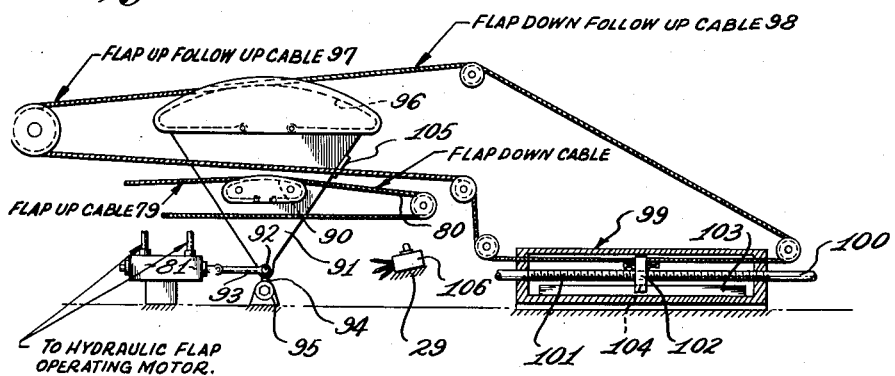
Figure 7 is a diagrammatic view partly in plan and partly in longitudinal section showing a portion of a landing flap control and follow-up system.

In order to understand thoroughly the operation of the combination airfoil of the present invention, the location and physical operation of three more electrical switches will now be described. Figure 7 shows a portion of the separate landing flap operating mechanism. Flap control cables 79 and 80 coming from the flap cable pulley 67, shown in Figure 5, are attached to opposite sides of an inner groove 90 of a flap control quadrant 91, so that fore-and-aft forces applied to the pilot's landing flap control lever 64 will exert similarly related forces on the control quadrant 91. This quadrant 91 is pin-connected at its lower end 92 to a flap control valve operating rod 93 and to a short link 94 which is rotatably mounted on a fixed support 95. The flap control quadrant 91 is also provided with an outer groove 96 in which two follow-up cables 97 and 98 are attached at opposite sides thereof. These cables lead to a follow-up mechanism 99 installed on the flap drive shaft 100. The mechanism consists of a threaded screw 101 machined on the drive shaft 100, this screw turning in a follow-up nut 102 which is prevented from turning by a stationary ridge 103 fitting into a guide groove 104 in the follow-up nut 102. Thus, as the landing flaps are raised or lowered by the drive shaft 100, the follow-up nut 102 will move longitudinally on the screw 101, and since the follow-up cables 97 and 98 are attached, one to each side of the follow-up nut 102, these cables can produce rotation of the flap control quadrant 91.

In operation from rest, when the flap control cables 79 and 80 pull to the right, for example, on the control quadrant 91, the quadrant will be rotated a small amount about an axis located at the point of tangency of the follow-up cables 97 and 98, since at this time the flaps have not yet moved and the follow-up cables are stationary. Therefore, the control valve rod 93 will be pulled out of the flap control valve 81 far enough to open it to produce flap movement in the desired direction. The valve used in the present instance requires only ⅛-inch to open fully. Now the flaps are in motion and the direction of follow-up nut 102 motion is such that the follow-up cables are pulling the control quadrant to the right also. Assuming the control cable motion is then stopped at some new position, the follow-up cables will rotate the flap control quadrant 91 about an axis located at the point of tangency of the control cables 79 and 80. This, of course, moves the control valve rod 93 back into the valve 81 until the off position is reached, where the flaps and follow-up cables will be stopped.

A switch actuator plate 105 is installed on the flap control quadrant 91 so that when the quadrant is in the "flaps down" position, this actuator plate 105 is in operating contact with the plunger shaft of a landing flap switch 106 which is firmly attached to the airplane structure 29. Normally, this landing flap switch 106 is in the non-actuated position, but it is adjusted to be actuated when the separate landing flaps reach a position three degrees short of full down. This switch functions to separate the dive brake surfaces as will be described later.

Figure 8:
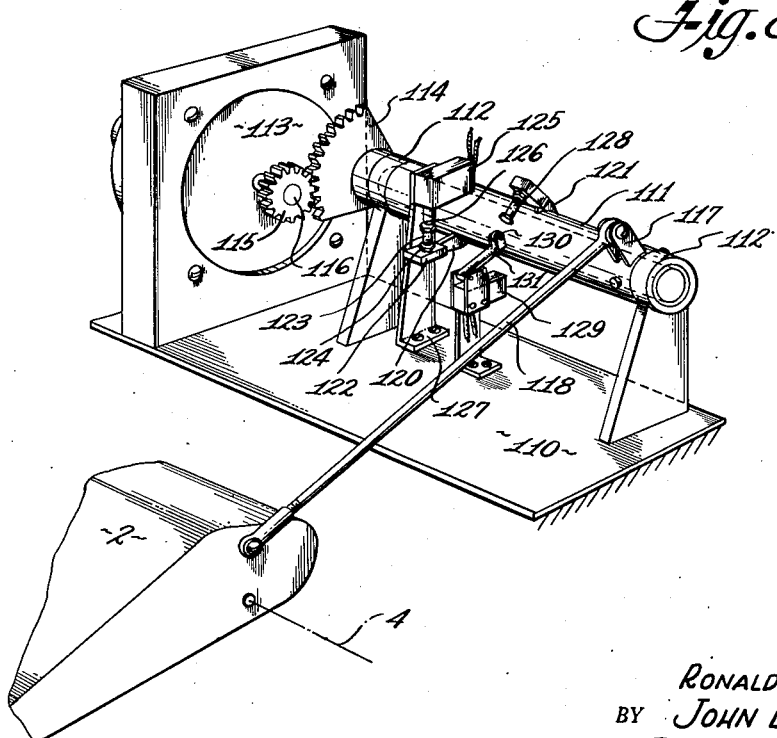
Figure 8 is a perspective view showing the installation of a dive brake operated mechanism for actuating a shut-off switch, an anti-creep switch, and a potentiometer.

The remaining two switches to be described are part of a mechanism located in the airfoil nose section 5. Figure 8 shows the installation of these microswitches and also one of the surface-operated potentiometers to control the synchronizer 56. Here the mechanism assembly consists of a fixed support plate 110 mounting a crankshaft assembly 111 in bearings 112, and a potentiometer 113. A gear sector 114 turned by the crankshaft 111 meshes with a spur gear 115 fixed to the potentiometer shaft 116. An operating crank 117 attached to the crankshaft 111 connects by a crank rod 118 to the lower dive brake surface 2 above its hinge line 4. Thus, all movements of the dive brake surfaces in opening or closing will rotate the crankshaft 111 and thereby regulate the position of the potentiometer 113.

Also rigidly attached to the crankshaft 111 are two microswitch operating arms 120 and 121, the one nearer the potentiometer 113 being provided at its outer end with a hollow bar 122 into which an anchor nut has been pressed. An anti-creep actuator bolt 123 with a lock nut 124 is installed through this anchor nut, the entire arm arrangement being such that as the crankshaft 111 rotates, the head of the anti-creep actuator bolt 123 operates an anti-creep switch 125 placed with its actuating button 126 in line facing the bolt and crossing the projected center line of the crankshaft 111 at a right angle.

This anti-creep switch 125 is securely mounted in an angle bracket 127 attached to the support plate 110, and is so located that when the lower dive brake surface 2 is closed, the actuating button 126 is held inwardly by the anti-creep actuator bolt 123, closing the switch circuit. Proper adjustment of the anti-creep actuator bolt 123 is obtained so that when the lower dive brake surface 2 lowers 2° and 30 minutes (corresponding to a total dive brake separation of 5°), the switch 125 will be opened. The function of this switch will be described later in the detailed electrical operation.

The other microswitch operating arm 121 is similar to the first except that its shut-off actuator bolt 128 points in the opposite direction from the anti-creep actuator bolt 123. The second switch, termed the shut-off switch 129, is securely mounted on the support plate 110, in position to be operated by the shut-off actuator bolt 128, but operates in reverse from the anti-creep switch 125, in that opening, instead of closing, of the dive brakes causes its actuation. The shut-off switch 129, like its actuator bolt 128, faces in opposite direction from the anti-creep switch components, and is so spaced and adjusted that when the lower dive brake surface 2 lowers 30° (giving 60° total dive brake separation), the shut-off actuator bolt 128 will contact a wheel 130 on a switch adapter 131 and actuate the shut-off switch 129. The shut-off switch 129, wired normally closed, is thus opened. The function of this switch will be given in a description of the electrical system operation to follow.

During dive brake movements exceeding 60°, the shut-off actuator bolt 128 continues its movement of the shut-off switch adapter 131 which permits sufficient overtravel to avoid damage to any parts. Since the foregoing dive brake switch mechanism is located in the airfoil nose section 5, its operation is not affected by aileron position. Also it will be noted that the action of the dive brake surfaces on both sides of the airplane can be controlled by these two switches located on one side only, since the synchronizer 56 keeps both pairs of surfaces at equal angles of separation at all times.

*Operation of combined systems*

Figure 9:
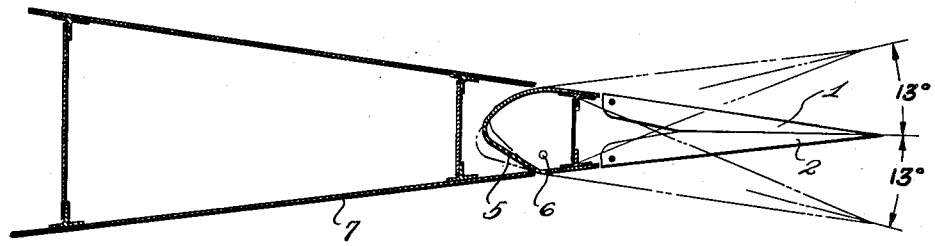
Figure 9 is a cross-sectional diagrammatic view showing the normal range of aileron motion of the trailing edge control surface.

A detailed description of the entire system operation will now be given. For normal aileron operation, the entire airfoil section is operated by the aileron mechanism previously described. The range of movement is from 13° up to 13° down from neutral, as shown in Figure 9. It is important to note that at any time and from any possible configuration of the airfoil or its separate surfaces that will be shown in the following description, this basic aileron movement can still be obtained on each side of the instantaneous neutral. Due to the geometry of the aileron mechanism, when the landing flaps are lowered, aileron range is increased slightly to plus or minus 15°. Therefore, adequate aileron response is always available.

Referring to Figure 10 for normal dive brake operation, electrical power is supplied from a 28-volt D. C. positive bus 135 to the dive brake interconnecting switch 83. When the landing flap cable pulley 67 (Figure 5) is in the extreme "flaps up" position, or less than 1/16-inch from this position, this interconnecting switch 83 is in the upper position as shown, so that power is available to the dive brake "open" switch 61 and the dive brake "close" switch 62 in the pilot's dive brake control handle 60. This handle is shown in the released position with neither of the foregoing switches actuated. There is a connection to the non-actuated side of the "open" switch 61 which will be described later and may be disregarded for the moment.

When the dive brake control handle 60 is pulled to actuate the "open" switch 61 against the switch spring 63 pressure, power is then supplied through the synchronizer 56 to the "open" solenoids 136 and 136a in the dive brake solenoid control valve 53 and 53a on each side of the airplane. The solenoids are connected to ground, or the negative side of the power supply; hence, the circuit is completed and the dive brake surfaces are opened to their maximum open position of 120°, as shown in Figure 11, at which position the dive brake actuating cylinder 35 has reached its limit of travel. The dotted line positions represent the aileron control range which is now possible when the entire nose section rotates. When the dive brakes are full open (which takes approximately two seconds of time) and the control handle 60 is released, the "open" switch 61 returns to normal, thus returning the solenoid valves 53 and 53a to neutral to remove hydraulic operating pressure from the cylinder.

When the dive brake control handle 60 is then pushed to actuate the "close" switch 62, power is supplied through the synchronizer 56 to the "close" solenoids 137 and 137a which allow hydraulic fluid pressure to close the dive brake surfaces completely.

For normal landing flap operation, electrical power is supplied from the positive bus 135 to the interconnecting switch 83. To lower the landing flaps all the way, the landing flap control lever 64 (Figure 5) is rotated completely aft, causing the separate landing flap system to be started, and closing the interconnecting switch 83 with its lower contact 138. This supplies power to the landing flap switch 106 which is now non-actuated, since the landing flaps have just started to lower, and occupying the upper position as shown in the schematic electrical diagram.

In this position of the landing flap switch 106, power is supplied to the dive brake "close" solenoids 137 and 137a to close the dive brake surfaces, if open, or merely hold them closed otherwise. When the separate landing flaps reach a position three degrees from full down, the landing flap switch 106 is actuated as explained previously, closing it with its lower contact 139. The combination airfoils now present the configuration shown in Figure 12, since both ailerons have been drooped by the combination of the ailerons with the landing flaps shown in Figure 2. The dotted line positions of Figure 12 represent the available aileron control range from this position.

From the landing flap switch lower contact 139 (Figure 10), power is now supplied through the shut-off switch 129, which is closed at present, to the dive brake "open" solenoids 136 and 136a, as controlled by the synchronizer 56. Thus, from the aileron drooped position, the dive brake surfaces will open until the shut-off switch 129 is opened, as previously explained, at 60° of dive brake angle, at which time they will stop since the shut-off switch 129 is in series with the landing flap switch 106. Figure 13 represents surface attitude at this time, after the landing flaps have reached their full down position. The dotted line positions again indicate the available aileron range from this new position.

It will be noted from the electrical diagram that if the pilot's dive brake control handle 60 is now operated, nothing will result, since power for the dive brake switches 61 and 62 is stopped at the interconnecting switch 83. In fact, no dive brake action is obtained during any positions except full up or full down of the landing flaps. This prevents the lower dive brake surface from ever deflecting to an unreasonably large angle where it would lose its desired effects.

When the pilot's landing flap lever 64 is then moved forward toward the "flaps up" position, and the separate landing flaps move up at least three degrees, the landing flap switch 106 will then return to its normal, non-actuated, position as shown in the diagram, again applying electrical power to the dive brake "close" solenoids 137 and 137a. This is true because the interconnecting switch 83 does not return to its normal position until the flap cable pulley 67 (Figure 5) is moved completely forward, as previously described, and the "close" circuit is now completed through the interconnecting switch 83, landing flap switch 106, synchronizer 56, "close" solenoids 137 and 137a, and ground.

Dive brake "anti-creep"

An additional feature is provided in addition to the basic system already described. It has been found that when the dive brake surfaces are closed and the solenoid control valves are in neutral, the surfaces have a tendency to creep open, due to the reduced air pressure on the upper side of the wing. Therefore, a circuit is provided which will keep hydraulic fluid pressure in the "close" lines of the dive brake actuating cylinders when the dive brake control handle is in the neutral position. This circuit (Figure 10) consists of a wire 140 from the non-actuated side of the dive brake "open" switch 61 through the anti-creep switch 125 on the right-hand dive brake, to both "close" solenoids 137 and 137a. The right-hand "close" solenoid 137a is connected directly to the anti-creep switch 125 and the left-hand "close" solenoid 137 is connected to this switch through the synchronizer 56. In this manner, with all switches and levers in their normal positions, power is continuously supplied to both "close" solenoids to keep the dive brake surfaces completely closed, and avoid any drag caused by their separation.

If the dive brakes are open more than 5°, however, this additional circuit is broken by the anti-creep switch 125 as described before, since obviously it is not desirable to have the dive brakes return to the closed position after just opening them and letting the dive brake control handle return to the neutral position.

Summary

A significant feature of the present invention, which will be apparent from the foregoing, is the sequence of use of the combination airfoil as a landing flap. For partial percentages of landing flap deflection, the surface acts as an ordinary aileron-type flap. This occurs throughout the range of from 0° to approximately 30° down. From this point on, as for the full down position of the landing flaps, the surface acts as a split-flap type landing flap, with the upper panel forming substantially the normal faired-in continuation of the wing trailing edge upper surface. This is definitely an advantage, since it has been found that a split-flap landing flap in a position 60° down contributes substantially more lift than an aileron type landing flap in a position 30° down, which would be the case if the dive brake surfaces were not opened at the final moment. The action as a landing flap is, therefore, a relatively slow rate of entire surface deflection down to approximately 30° from neutral, and then a relatively fast separation of the surfaces to the final "flaps down" position.

While the apparatus of the present invention is shown as applied to a conventional type airplane with tail surfaces, it may easily be seen that the same method also applies to an all-wing type airplane. In fact, for the latter type airplane, by providing separate controls for the dive brake mechanism on each side of the airplane, drag rudders are obtained; and by handling the aileron mechanisms similarly, elevons for both elevation and roll control are obtained. Thus, all of the above mentioned functions can be combined into a single portion of the wing area. Since full-power control systems are used throughout, the pilot is not called upon to resist any of the surface loads resulting from the variations of surface deflection.

In the present embodiment of the invention, merely a centering spring is provided to neutralize the aileron control; however, when the principles and means shown herein are applied to elevons on an all-wing airplane, a synthetic "feel" responsive to air speed or normal acceleration is preferred in the pitch or elevation control system.

What is claimed is:

1. In a control system for an aircraft, a control surface on opposite sides of said aircraft, each said surface comprising a nose section hinged to said aircraft and superposed upper and lower panels each hinged to the rear of said nose section, surface power means positioned outside of said control surfaces and connected to rotate said control surfaces about their respective nose section hinges, flap control means connected to said surface power means to move said control surfaces in the same direction simultaneously between neutral and down positions, flap follow-up means connected to said flap control means to move in exact accordance with said control surfaces as moved by said flap control means, electrically controlled hydraulic panel power means positioned in each of said nose sections and connected respectively to each of said upper and lower panels in oppositely moving relationship to move said panels between open and closed positions, electrical switching means electrically connected to energize said panel power means in either of two directions, said switching means located to be mechanically operated by movement of said flap follow-up means to energize said panel power means in the "open" direction upon the approximate reaching of said down position by said control surfaces and to energize said panel power means in the "close" direction upon the approximate leaving of said down position by said control surfaces.

2. Apparatus in accordance with claim 1 including aileron control means additionally connected to said surface power means to move said control surfaces in opposite directions simultaneously, independent of movement of said control surfaces by said flap control means.

3. In a control system for an aircraft, a control surface on opposite sides of said aircraft, each said surface comprising a nose section hinged to said aircraft and superposed upper and lower panels each hinged to the rear of said nose section, surface power means positioned outside of said control surfaces and connected to rotate said control surfaces about their respective nose section hinges, flap control means connected to said surface power means to move said control surfaces in the same direction simultaneously between neutral and down positions, flap follow-up means connected to said flap control means to move in exact accordance with said control surfaces as moved by said flap control means, electrically controlled hydraulic panel power means positioned in each of said nose sections and connected respectively to each of said upper and lower panels in oppositely moving relationship to move said panels between open and closed positions, electrical control switching means electrically connected to energize both said panel power means in either the "open" or "closed" direction, said control switching means located to be mechanically operated by movement of said flap follow-up means to energize both said panel power means in said "open" direction upon the approximate reaching of said down position by said control surfaces and to energize both said panel power means in said "close" direction upon the approximate leaving of said down position by said control surfaces, manual panel control means also electrically connected to energize both said panel power means in either the "open" or "close" direction, and follow-up switching means electrically connected to select energization control of both said panel power means either by said control switching means alone or by said manual panel control means alone, said follow-up switching means being mechanically connected to said flap follow-up means to select said control switching means as the operative path when said control surfaces are moved by said flap control means to any position except said neutral and to select said manual panel control means as the operative path when said control surfaces are positioned in said neutral by said flap control means, whereby manual separation control of said upper and lower panels is provided at all times when said flap follow-up means is in said neutral and automatic separation control of said upper and lower panels as set forth above is provided at all times when said flap follow-up means is in any position except said neutral.

4. Apparatus in accordance with claim 3 including aileron control means additionally connected to said surface power means to move said control surfaces in opposite directions simultaneously, independent of movement of said control surfaces by said flap control means.

5. A control system for operating a split-flap type aircraft dive brake having superposed flaps rotatably hinged to a hinge-mounting structure, which comprises two upper links rotatably attached to the upper flap of said dive brake on one side of the hinge line thereof, two lower links rotatably attached to the lower flap of said dive brake on the opposite side of the hinge line thereof with respect to the direction of attachment of said upper links from said upper flap hinge line, first crank means pivotally mounted on said structure and rotatably connected to one of said upper links and to one of said lower links on the same side of the mounting pivot of said first crank means, second crank means pivotally mounted on said structure and rotatably connected to the other upper link and to the other lower link, said other two links being connected to said second crank means on the opposite side of the mounting pivot thereof from that of the link connections to said first crank means, an extensible linkage rotatably connected at each end thereof to said first and second crank means, respectively, a free-floating hydraulic piston and actuating cylinder assembly connected within said extensible linkage, a four-port electrical solenoid-operated control valve, flexible alternate "open" and "close" lines operatively connecting said valve to said piston and cylinder assembly, a hydraulic power supply system, and pressure and return lines connecting said hydraulic system to said four-port control valve, whereby said dive brake flaps are opened and closed quickly by means of the fast action of said control valve.

RONALD E. CRANDALL.
JOHN E. GLENN.

REFERENCES CITED

The following references are of record in the file of this patent:

UNITED STATES PATENTS

| Number | Name | Date |
| --- | --- | --- |
| 2,173,538 | McKellar | Sept. 18, 1939 |
| 2,254,304 | Miller | Sept. 2, 1941 |
| 2,279,615 | Bugatti | Apr. 14, 1942 |
| 2,376,731 | Stoner | May 22, 1945 |
| 2,422,035 | Noyes | June 10, 1947 |